(No Model.)
N. O. STARKS.
WHEEL.
No. 527,735. Patented Oct. 16, 1894.
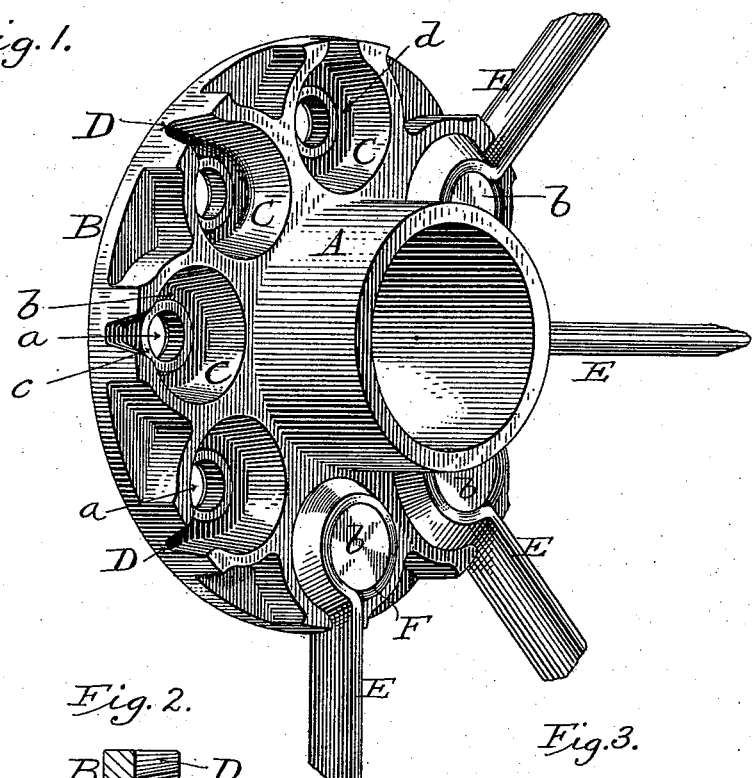
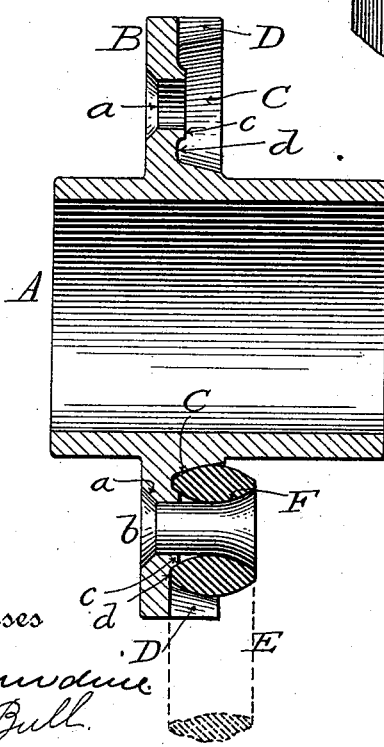
NILS O. STARKS,
Inventor
Witnesses
by Dodge Sons,
Attorneys.

UNITED STATES PATENT OFFICE.

NILS O. STARKS, OF MADISON, WISCONSIN, ASSIGNOR TO THE FULLER & JOHNSON MANUFACTURING COMPANY, OF SAME PLACE.

WHEEL.

SPECIFICATION forming part of Letters Patent No. 527,735, dated October 16, 1894.

Application filed January 22, 1894. Serial No. 497,678. (No model.)

*To all whom it may concern:*

Be it known that I, NILS O. STARKS, a citizen of the United States, residing at Madison, in the county of Dane and State of Wisconsin, have invented certain new and useful Improvements in Wheels, of which the following is a specification.

My invention relates to vehicle wheels, and consists of the novel construction and arrangement of parts as hereinafter set forth and claimed.

In the drawings,—Figure 1 is a perspective view of so much of the wheel as is necessary to the proper illustration of my invention; Fig. 2, an axial sectional view; and Fig. 3, a view of part of one of the spokes.

A designates the hub, said hub being provided with a radial or substantially radial flange or collar E.

In using the term radial, I do not wish to confine myself to a flange which is perpendicular to the axis of the hub, the word being employed in its broader sense,—and it is intended to embrace any flange whose radial lines emanate from a common point in the longitudinal axis of the hub.

Upon one face of the flange is formed a series of seats or recesses C, substantially circular in form. In the center of each seat there is a hole or opening $a$, which passes entirely through the flange and is enlarged or countersunk on the side opposite the recesses C, to form a seat for the head of the rivet or other fastening device $b$. That portion of the recess or seat C which immediately surrounds the opening $a$, is slightly raised to form a rim $c$, so that there is formed in the bottom of the recesses or seats a channel or groove $d$ to seat the spoke at its side edges. The inner walls of the recesses converge toward the bottom to conform to the form of the spokes in cross section. Each seat or recess is provided with a circumferential slot or opening D, the walls of which are a continuation of the recess.

E denotes the spokes, which are substantially elliptical in cross section, as shown in Fig. 2. Each spoke is provided with an eye or enlargement F, formed by bending one end into circular shape, this eye or enlargement being of such size and shape as to fit snugly within the recesses or seats C. The spokes thus find a firm bearing in the seats C,—the rim $c$ fitting within or projecting into the eye F,—the outer peripheral faces of the eye coming into close contact with the converging walls of the recess,—the inner edge or seat of the eye finding a firm seat in the channel $d$, while the body or shank of the spoke fits within the radial slot or opening E. When the spoke is in the position just stated, the rivet or other fastening device $b$ is passed through the eye F and the opening $a$ in the flange, and is then rigidly secured in place, the parts interlocking and all play or movement rendered impossible.

Stability, simplicity, strength, and also readiness in assembling the parts, all contribute to the efficiency and commercial value of the wheel.

Having thus described my invention, what I claim is—

1. In a vehicle wheel, a hub provided with a flange having a series of circular sockets in its side face; in combination with a series of spokes having eyes fitted to said sockets; and means for uniting the spokes to the flange.

2. In a wheel, the combination of a hub having a radial flange formed with recesses or seats in its side face, said seats being wider than the thickness of the spokes, and each formed with a circumferential opening of a width sufficient to receive the body of the spoke, a series of spokes each having one end provided with a perforate head or enlargement to enter one of said seats, and a series of rivets or other fastening device, each passing through the flange and through one of the spoke heads, and serving to retain such spoke in place.

3. A wheel comprising a hub having a radial flange or rim A, said flange provided on one face with a series of substantially circular recesses or seats; openings extending through the flange in the center of said seats; raised rim $c$ around said openings; slots formed in the outer walls of the seats or recesses; spokes provided with eyes, said eyes and spokes being adapted to fit within the seats and slots, respectively; and fastening devices passing through the eyes and the openings in the flange.

4. A wheel comprising a hub having a radial flange or rim, said flange provided on one face with a series of substantially circular recesses or seats having a groove in their bottoms; openings extending through the flange and the centers of said seats; slots formed in the outer walls of the seat; spokes provided with eyes, said spokes and eyes being adapted to be seated within the seats and slots respectively; and fastening devices passing through the eyes and the openings in the flange.

In witness whereof I hereunto set my hand in the presence of two witnesses.

NILS O. STARKS.

Witnesses:
W. R. BAGLEY,
J. I. RUDD.